United States Patent Office 2,723,105
Patented Nov. 8, 1955

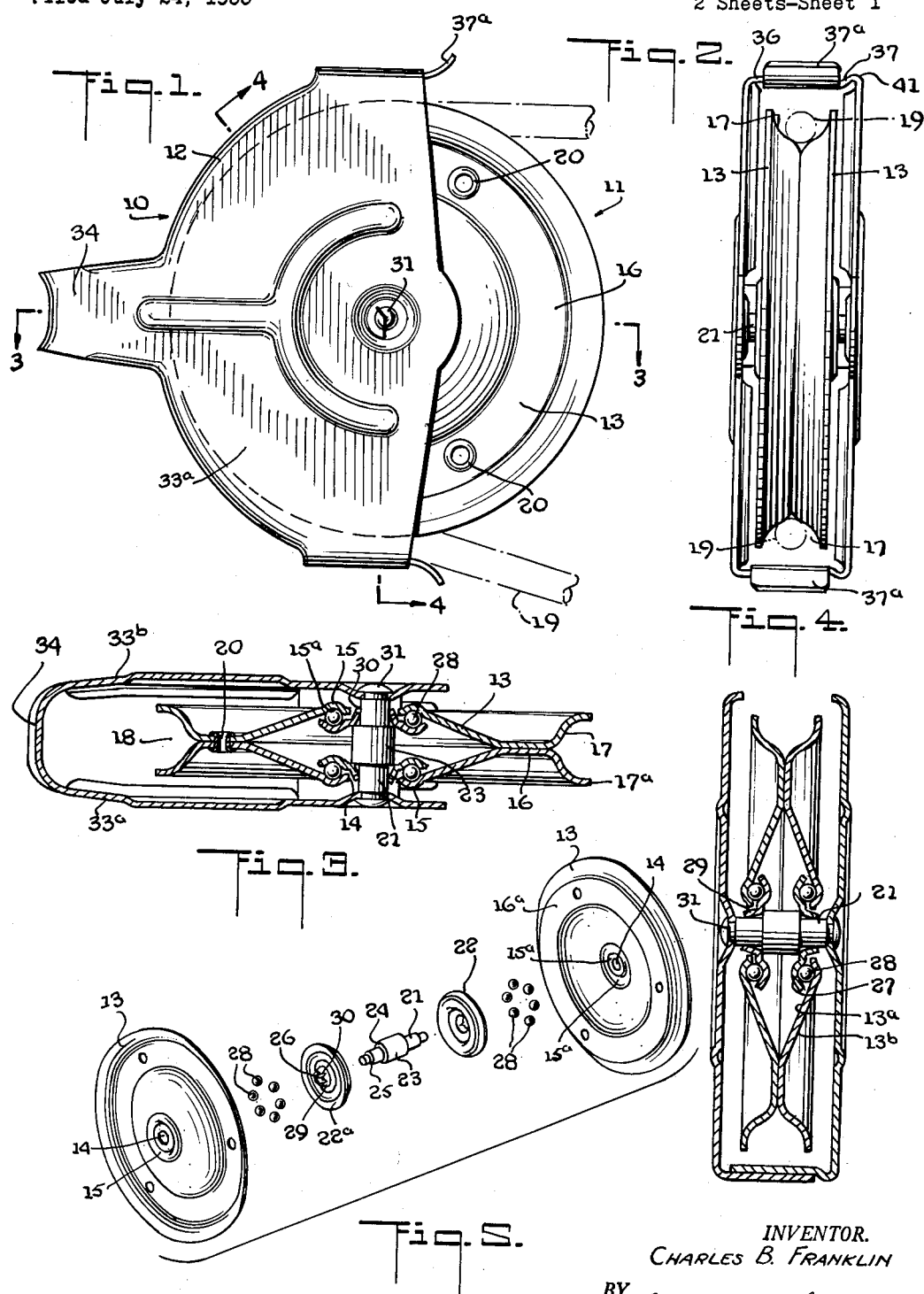

2,723,105

FRICTIONLESS PULLEY

Charles B. Franklin, Brooklyn, N. Y.

Application July 24, 1953, Serial No. 369,987

3 Claims. (Cl. 254—190)

The present invention relates to a frictionless pulley device and, more particularly, it relates to a frictionless ball bearing pulley adapted for use with a household clothes line.

In accord with my invention, I have provided a clothes line pulley comprising a pulley wheel, a casing for the pulley wheel and a shaft connecting the pulley wheel and casing. The pulley wheel comprises a pair of primary disks which rotate around the shaft on a ball bearing surface. A pair of secondary disks are fixedly mounted near each end of the shaft and each secondary disk is disposed inwardly of an adjacent primary disk. The adjacent primary and secondary disks have cooperating annular grooves on their faces which form raceways therebetween for a plurality of ball bearings. These balls comprise the bearing surface on which the primary disks rotate. Moreover, the balls support the primary disks. Thus the pulley wheel is able to rotate with a minimum of friction. The primary disks are formed with outwardly turned flanges so as to provide a circumferential groove for a clothes line when the disks are riveted together in opposing relation.

Furthermore, a casing formed of a unitary blank piece of metal is provided for the pulley wheel. This casing has special lip members to prevent the clothes line from fraying and splitting as it moves around the pulley wheel. There is also provided on the casing member a metal strap by which the entire pulley may be readily attached to a supporting wall, pole or the like.

Accordingly, it is an object of the present invention to provide a frictionless pulley wherein the pulley wheel rotates on a bearing surface with a minimum of friction.

It is a further object of the present invention to provide a frictionless pulley wherein the pulley wheel is formed of two pairs of primary and secondary disks and wherein said disks cooperate with each other to form a pair of ball bearings raceways.

Yet another object of the present invention is to provide a frictionless pulley of the above described character wherein the primary disks are rotatably supported by the ball bearings.

Another object of the present invention is to provide a pulley of the above described character having a casing formed of a unitary blank piece and wherein the casing has lip guards to prevent abrasion of the clothesline used with the pulley.

Yet another object of the present invention is to provide a pulley of the above described character which is of simple and inexpensive construction and which is capable of sustaining long and vigorous use.

Other objects and advantages of the present invention will become more apparent as it is described in detail below with particular reference to the accompanying drawings wherein Figure 1 is a side view of the pulley of the present invention;

Figure 2 is an end view of the pulley shown in Figure 1;

Figure 3 is a sectional view taken on line 3—3 of Figure 1 and looking in the direction of the arrows;

Figure 4 is a view taken on line 4—4 of Figure 1 and looking in the direction of the arrows;

Figure 5 is an exploded view of the parts comprising the pulley portion; and

Figure 6:
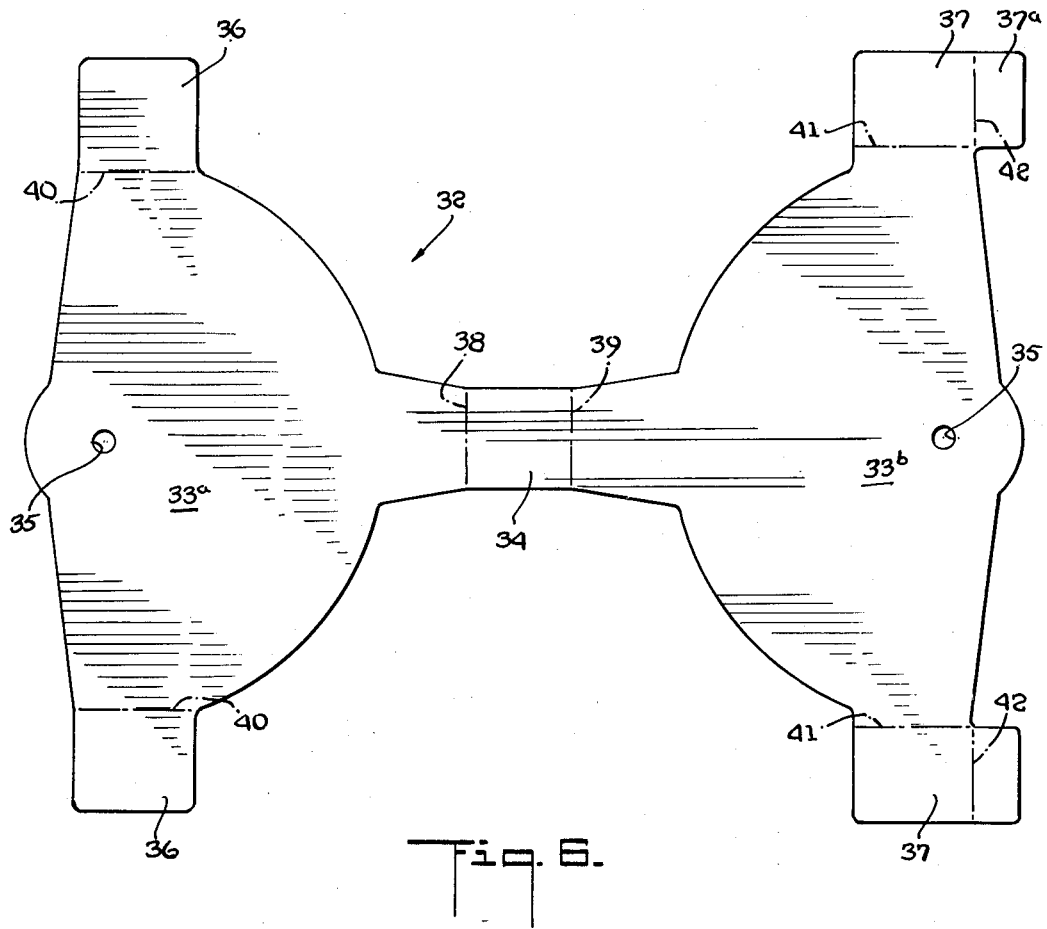
Figure 6 is a plan view of the blank metal piece from which the pulley casing is formed.

With particular reference to Figure 1, there is shown a metal pulley 10 comprising a pulley wheel 11 rotatably mounted in a casing 12. The pulley wheel 11 is formed of a pair of opposing disks 13, which disks have inner and outer faces 13a and 13b, respectively. Each disk 13, which is preferably formed of a single piece of metal, has a centrally located circular aperture 14. Surrounding the aperture 14 on the outer face 13b of each disk 13 is an annular ridge 15 which forms a corresponding annular groove 15a on the inner face 13a of the disk.

In describing the outer face of each disk 13, the outer face 13b of each disk slopes inwardly away from the ridge 15 until it reaches a point approximately midway between the center of the disk and its circumferential edge. The outer face 13b of each disk 13 then extends further along a plane perpendicular to the axis of the disk so as to form a flat annular portion 16. An outwardly turned flange 17 is disposed at the outer edge of each flat portion 16. The flanges 17 at first bend outwardly away from their adjacent flat portions 16 and then extend as at 17a along planes parallel to the flat portions.

The inner faces 16a of the flat portions 16 of each disk 13 are adapted to engage in registry with each other when the disks are in opposed relation. Moreover, the opposing flanges 17 form a circumferential groove 18 around the pulley wheel, which groove is adapted to receive a clothes line 19. The disks 13 are fixedly held together by rivets 20 which extend through opposing flat portions 16.

There is further provided a stationary shaft 21 which is adapted to carry a pair of secondary disks 22. The shaft 21 has a thick portion 23 extending around its center. The ends of this thick portion 23 form the shoulders 24. The ends of the shaft 21 are reduced in diameter so as to form the shoulders 25.

The secondary disks 22 are fixedly mounted on the shaft 21 and do not rotate. Like disks 13, the secondary disks 22 have centrally located apertures 26 so that the disks may be mounted on the shaft 21. The body of each disk 22 slopes away from the aperture 26, first inwardly and then outwardly to form the annular groove 27 on the outer face 22a of the disk. These grooves 27 are of the same size and depth as grooves 15a on disks 13. Thus when the disks 13 and 22 are placed in normal position, each groove 27 opposes an adjacent groove 15a to form a raceway for ball bearings 28. Accordingly, there are provided two separate raceways for the ball bearings 28.

Each disk 22 further has an outwardly extending bored neck 29, which defines the outer opening of aperture 26. When the secondary disks 22 are placed on the shaft 21, the bottom of the neck 29 of each disk will abut the shoulders 24 of the shaft, which shoulders serve as stop members. The disks 22 are preferably formed of a single piece of metal.

The secondary disks 22 are force fit into position on the shaft 21. This causes cracks 30 to appear around the necks 29 of the disks 22. The portions of the neck 29 between the cracks 30 serve as retaining teeth to prevent the disk 22 from slipping off the shaft 21. The casing 12 is formed of a metal blank 32 comprising two side portions 33a and 33b disposed at either end thereof and joined integrally together by a narrow strip portion 34, as best seen in Figure 5. The side portions 33a and 33b have a generally semi-circular shape. An aperture 35 is provided in each side portion 33a and 33b at a point where the radii of the semi-circular side portions intersect.

At opposite ends of the side portion 33a there are extending wings 36 of a generally square shape. At opposite ends of the other side portion 33b, there are generally rectangularly shaped wings 37. The wings 37 jut out as at 37a beyond the body of the side portion 33b in a direction parallel to the narrow strip 34.

In order to form the casing 12, the narrow strip 34 is bent inwardly along dotted lines 38 and 39 until the side portions 33a and 33b are brought into parallel position with their corresponding apertures 35 in registry. Next the wings 36 are bent inwardly along dotted lines 40 until they are at right angles to the side portion 33a. The wings 37 are bent inwardly along dotted lines 41 until they are at right angles to side portion 33b. Also, the portions 37a of wings 37 are bent slightly outward along dotted lines 42. It will then be found that corresponding wings 36 and 37 lie adjacent to each other. The wings 36 and 37 may be welded together or affixed in any other manner so that the casing 12 has a permanent shape as seen in Figure 1.

The wings 36 and 37 are also arranged so that the wings 37 lie inwardly of wings 36. The portions 37a of wings 37 now jut outwardly away from the casing 31 and will serve as guard lips to prevent the clothes line 19 from fraying against the edges of the casing 12.

The narrow strip portion 34 serves as a strap around which a rope may be fastened so that the pulley 10 may be readily attached to a supporting structure such as a wall, fence, pole or the like.

In assembling the pulley 10, the secondary disks 22 are force fit onto the shaft 21 with their grooves 27 disposed outwardly and with their neck portions 29 abutting shoulders 24. A plurality of ball bearings 28 are disposed in each groove 27 and then the disks 13 are placed in position over the ball bearings 28 so that the ball bearings are housed in the raceways formed by grooves 27 and 15a. Disks 13 are then permanently joined together by rivets 20. It should be noted that the disks 13 do not engage the shaft 21 but are supported wholly by the ball bearings 28 in the grooves 15a. Thus, the disks 13 rotate on a ball bearing surface. The shaft 21, with its assembled disks 13 and 22 is then placed in the casing 12 with the ends of the shaft extending through apertures 35. Finally, the ends of the shaft 21 are hammered to form rivet heads 31 so that the casing will not come off the shaft.

It is, of course, to be understood that my pulley may be made of any suitable material and that it may be adapted for uses other than with a household clothes line.

While the invention has been described in such detail and shown with respect to the accompanying drawings, it is not to be limited to such details, since many changes and modifications may be made in the invention without departing from the spirit and scope thereof. Hence, it is desired to cover any and all forms and modifications of the invention which may come within the language and scope of any one or more of the appended claims.

I claim:

1. A frictionless pulley adapted for use with a clothes line comprising a unitary solid and stationary shaft, said shaft being thickened around its center to form a pair of shoulder means and being of reduced diameter at its ends to form a second pair of shoulder means, a pulley wheel including a pair of centrally apertured and stationary disks mounted on said shaft in spaced apart relation and abutting said first mentioned pair of shoulder means, each said disk having an outwardly extending neck portion with retaining teeth thereon, annular grooves disposed on the outer faces of said disks, a pair of centrally apertured and opposing disks rotatable around said shaft and out of engagement therewith, annular grooves disposed on the inner faces of said rotatable disks, the grooves of said rotatable disks cooperating with the grooves of said stationary disks to define a pair of raceways, ball bearing means in said raceways, said rotatable disks being supported by said ball bearing means, said rotatable disks being permanently affixed to and in engagement with each other so that they rotate simultaneously around said shaft, said rotatable disks each having an outwardly turned flange at its outer edge, said outwardly turned flanges opposing each other so that together they define on said pulley wheel a circumferential groove adapted to receive a clothes line, said rotatable disks engaging each other near their opposing flanges only, and a unitary casing for said pulley wheel, said casing mounted on said shaft and abutting said second mentioned shoulder means.

2. A frictionless pulley adapted for use with a clothes line comprising a unitary solid and stationary shaft, said shaft being thickened around its center to form a pair of shoulder means and being of reduced diameter at its ends to form a second pair of shoulder means, a pulley wheel including a pair of centrally apertured, spaced apart and stationary disks mounted on said shaft in spaced apart relation and abutting said first mentioned pair of shoulder means, each said disk having a centrally located and outwardly extending neck portion, retaining teeth on said neck portions to prevent said disks from slipping along said shaft, annular grooves disposed on the outer faces of said disks, a pair of centrally apertured and opposing disks rotatable around said shaft and out of engagement therewith, annular grooves disposed on the inner faces of said rotatable disks, the grooves of said rotatable disks disposed outwardly of and cooperating with the grooves of said stationary disks to define a pair of raceways, ball bearing means in said raceways, said rotatable disks being permanently affixed to and in engagement with each other so that they rotate simultaneously around said shaft, said rotatable disks diverging outwardly near their circumferences to define a circumferential groove adapted to receive a clothes line, said rotatable disks being supported by said ball bearing means, and a unitary casing mounted on said shaft and abutting said second mentioned shoulder means.

3. A frictionless pulley in accord with claim 2 wherein said casing comprises a pair of spaced apart and parallel walls, each said wall being generally semi-circular in shape, the ends of said shaft extending through said walls and having thickened portions disposed outwardly of said walls to retain said casing on said shaft.

References Cited in the file of this patent

UNITED STATES PATENTS

| | | |
|---|---|---|
| 279,985 | Sharrett | June 26, 1883 |
| 772,022 | Brinley | Oct. 11, 1904 |
| 1,132,651 | Clermont | Mar. 23, 1915 |
| 1,546,775 | Bryant | July 21, 1925 |
| 1,622,296 | Thornton | Mar. 29, 1927 |
| 1,691,183 | Forse, Jr. | Nov. 13, 1928 |
| 2,206,327 | Manning | July 2, 1940 |
| 2,535,428 | Kubiak | Dec. 26, 1950 |